United States Patent [19]

Abe et al.

[11] Patent Number: 5,199,071

[45] Date of Patent: Mar. 30, 1993

[54] MODEM MODE MATCHING METHOD WITH PBX DIAL-IN

[75] Inventors: Kenichi Abe; Masumi Kaneuchi; Kenji Kurashina; Kenzou Kaji; Kikuo Sumiyoshi, all of Tokyo, Japan

[73] Assignees: NTT Data Communications Systems Corporation; Ohkura Electric Co., Ltd.; Texas Instruments Japan Ltd., Tokyo, Japan

[21] Appl. No.: 476,449

[22] PCT Filed: Sep. 27, 1989

[86] PCT No.: PCT/JP89/00977

§ 371 Date: Jul. 10, 1990

§ 102(e) Date: Jul. 10, 1990

[87] PCT Pub. No.: WO90/03702

PCT Pub. Date: Apr. 5, 1990

[30] Foreign Application Priority Data

Sep. 27, 1988 [JP] Japan ............................ 63-239785

[51] Int. Cl.⁵ .......................................... H04M 11/00
[52] U.S. Cl. ........................................ 379/98; 379/102
[58] Field of Search ........................ 379/98, 97, 94, 96, 379/93, 100, 102

[56] References Cited

U.S. PATENT DOCUMENTS

| | | | |
|---|---|---|---|
| 4,788,657 | 11/1988 | Douglas et al. | 379/98 |
| 4,916,607 | 4/1990 | Teraichi et al. | 379/100 |
| 4,935,955 | 6/1990 | Neudorfer | 379/100 |
| 4,939,767 | 7/1990 | Saito et al. | 379/100 |

Primary Examiner—James L. Dwyer
Assistant Examiner—Wing F. Chan
Attorney, Agent, or Firm—Frishauf, Holtz, Goodman & Woodward

[57] ABSTRACT

A method and apparatus for matching operation modes of modems for connection of terminals to a telephone line, i.e., matching operation forms determined by a communication speed, a coding format, a synchronizing format, etc., on both the calling and answering sides of the telephone line. When the answering side detects an extension specifying signal sent from the calling side, an operation mode of a modem corresponding to the extension specifying signal is used to select the specified operation mode from among a plurality of operation modes for modem circuits equipped on the answering side, for matching the operation mode of the answering side modem with that on the calling side. The answering side modem has a function of detecting a push-button dial signal serving as the extension specifying signal, and a function of providing the plurality of operation modes for the modem and optionally changing the operation mode upon an instruction from an answering side terminal. The answering side terminal determines the correlation between the extension specifying signal from the calling side and the operation mode of the calling side modem. A calling terminal sets a call using a telephone number which contains the extension specifying signal of the dial-in service corresponding to the operation mode of the calling side modem, and the answering side terminal converts the extension specifying signal to the corresponding operation mode.

4 Claims, 6 Drawing Sheets

MODEM MODE MATCHING METHOD WITH PBX DIAL-IN

TECHNICAL FIELD

The present invention relates to a method of matching operation modes of Data circuit terminating equipments (DCE) such as modems (modulators/demodulators) for connection of terminals to a telephone line, i.e., operation forms determined by a communication speed, a coding format, a synchronizing mode, etc., on both the calling and answering sides of the telephone line.

BACKGROUND OF THE INVENTION

Digital data communication via telephone lines as analog circuits have become more prevalent, and modems for performing analog-to-digital and digital-to-analog conversion of signals between terminals and telephone lines have been used widely. To make matching with various signal formats and transmission formats, modems are required to have various operation modes. For example, an operation mode is determined dependent on setting conditions such as a standard specified in Recommendation from Consultative Committee of International Telegraph and Telephone (CCITT) V.21, V.22, V22bis, V.23,V.26bis, V.27ter or V.29, a communication speed given by 300, 1200, 2400, 4800, 7200 or 9600 bps (bits/second), a synchronizing mode given by synchronous or asynchronous mode, the presence or absence of echo protection, etc.

For carrying out data communication via telephone lines, it is essential to match operation modes of modems on both the calling and answering sides with each other. A conventional mode matching method has been practiced by confirming an operation mode of a modem at the other party in advance, and then (a) manually setting an operation mode of one's own modem or (b) replacing one's own modem with another one as required, in conformity with the operation mode of the opposite modem. However, such a conventional method is disadvantageous in requiring the intricate process to set an operation mode after exchanging information between the calling and answering sides prior to connection of a line, and to replace the existing modem with a new one when the setting cannot be completed. It is also difficult to be adaptable for many kinds of operation modes.

DISCLOSURE OF THE INVENTION

An object of the present invention is to reduce intricacy in matching operation data circuit terminating equipment (hereinafter called "DCE") such as modes of modems at the transmit and receive ends of a communication line as encountered in the prior art, and to automate the matching of operations modes.

When the answering side detects an extension specifying signal sent from the calling side, an operation mode of a DCE corresponding to the extension specifying signal is read out of conversion means to select the specified operation mode among a plurality of operation modes for DCE circuits equipped on the answering side for matching the operation mode of the answering side DCE with that on the calling side.

The answering side DCE has a function of detecting a push-button dial signal serving as the extension specifying signal, and a function of providing the plurality of operation modes for the DCE and optionally changing the operation mode upon an instruction from an answering side terminal. The answering side terminal has means for determining the correlation between the extension specifying signal from the calling side and the operation mode of the DCE. A calling terminal sets a call using a telephone number which contains the extension specifying signal of the dial-in service (direct inward dialing service) corresponding to the operation mode of the DCE and the answering side terminal has means for converting the extension specifying signal to the corresponding operation mode.

BEST MODE FOR CARRYING OUT THE INVENTION

Figure 1:
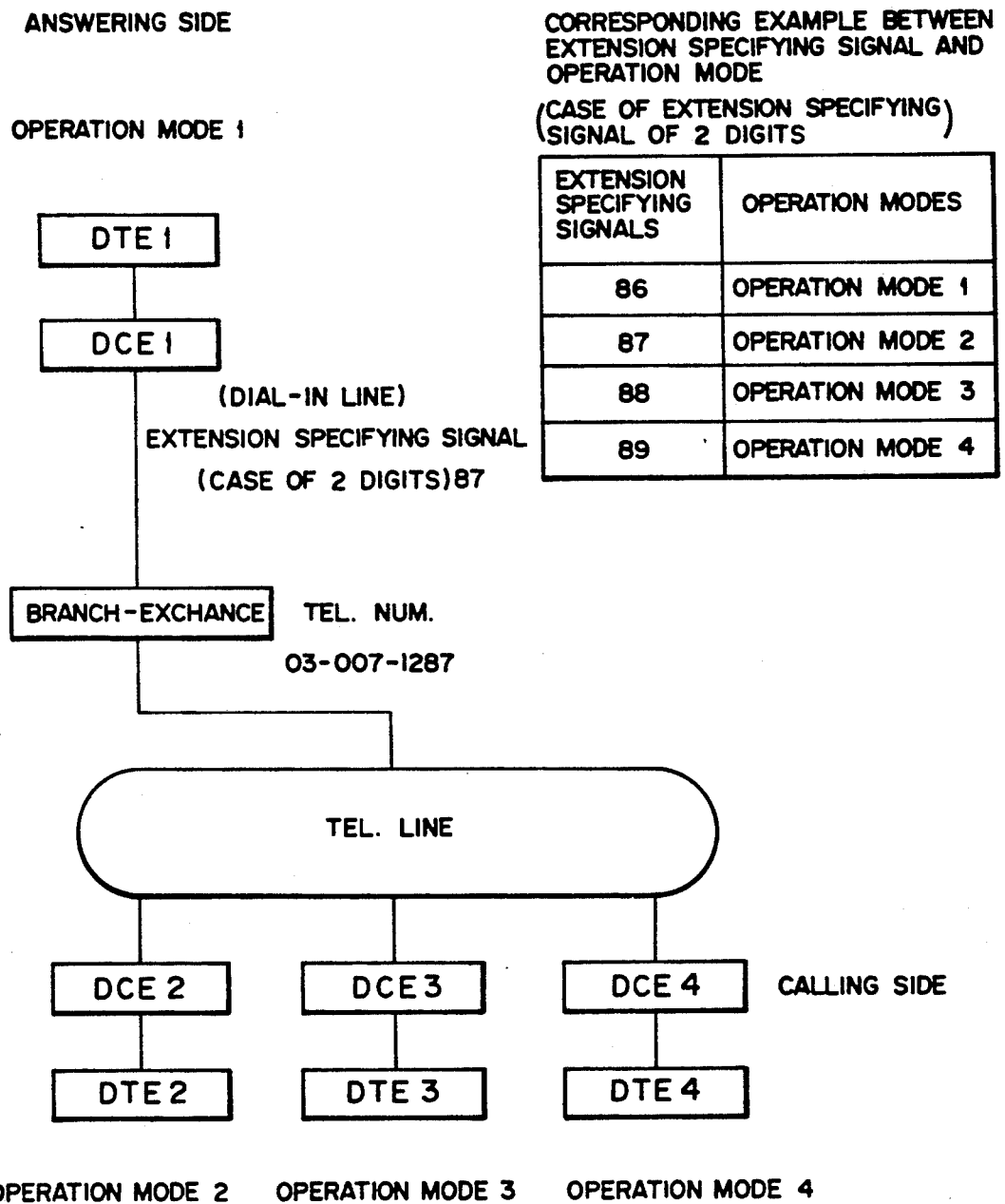
FIG. 1 is a schematic view of a system to which a matching method of the present invention is applied.

FIG. 1 schematically shows a system to which a matching method of the present invention is applied. Referring to FIG. 1, the mode matching method of modems according to the present invention employs dial-in service for telephone lines.

The term dial-in service (direct inward dialing service) is explained in detail in "Technical Reference for Utilizing a Telephone Network" published by Electric Communication Association of Japan (Juridical Foundation), Sep. 30, 1985, pp. 32-39, and hence will be summed up here.

Figure 2:
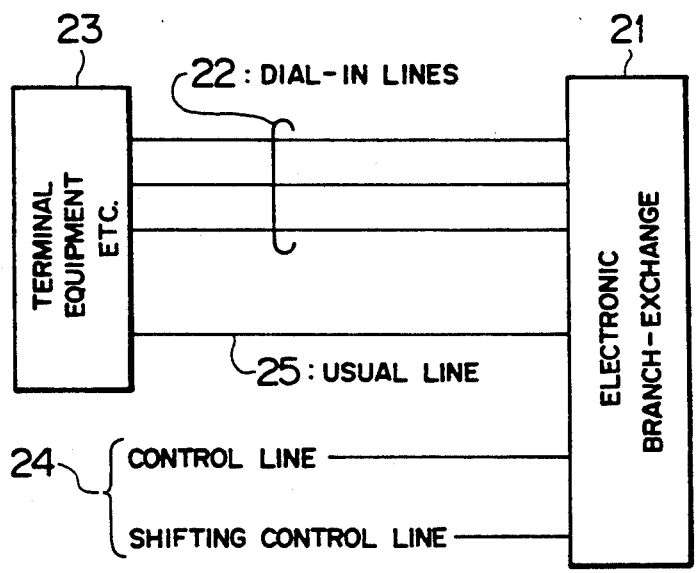
FIG. 2 shows a relay system for dial-in lines.
Figure 3:
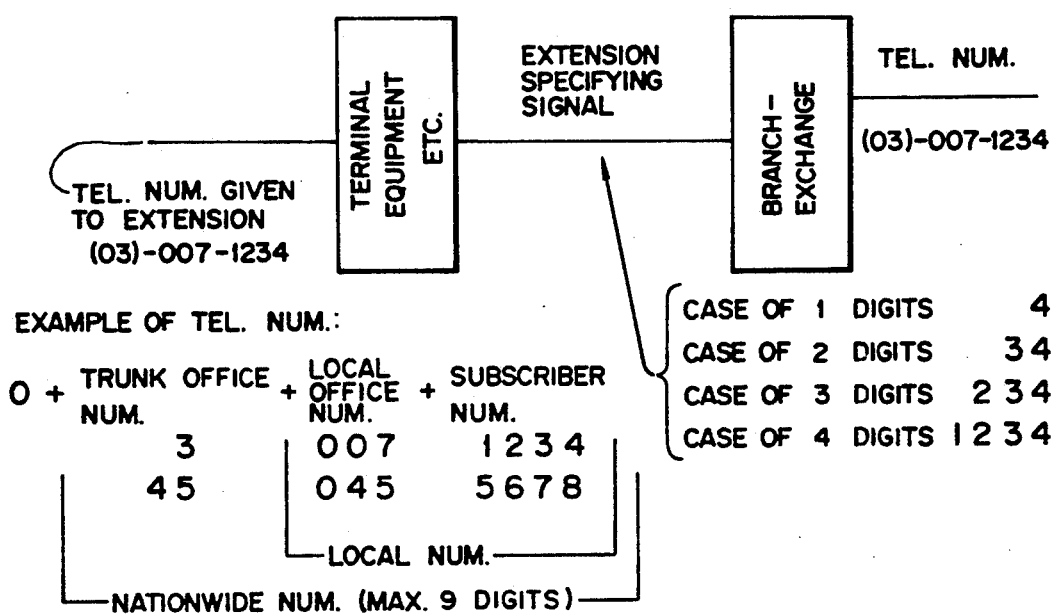
FIG. 3 shows a number applying method for dial-in lines.

The term dial-in means that calling can directly be made with no attendant board, when sending a call from a branch-exchange to an extension for terminal equipment or the like through a subscriber's line. FIG. 2 shows a dial-in relay system. Connection to extensions for terminal equipment or the like is made by employing usual telephone numbers which are allocated to the extensions for terminal equipment or the like one by one. The number given by the last first to fourth digits of each telephone number is sent as an extension specifying signal from the branch-exchange to the terminal equipment or the like, thereby specifying the extension to be called. A practical example is shown in FIG. 3.

By employing lines capable of the dial-in service therethrough (referred to as dial-in lines hereinafter), the extension specifying signal (from 1 to 4 digits) is transmitted to the terminal equipment or the like (DCE 1 in FIG. 1) after arrival of a call. This permits setting operation modes of a modem corresponding to the extension specifying signals in one-to-one relation, and selecting the desired operation mode.

As shown in a corresponding example between the extension specifying signals and the operation modes in FIG. 1, for instance, the extension specifying signal "86" can be set to be corresponding to "operation mode 1". Note that the extension specifying signals are expressed by numbers of two digits in this instance, any numbers of from 1 to 4 digits may be used in practice.

Figure 4:
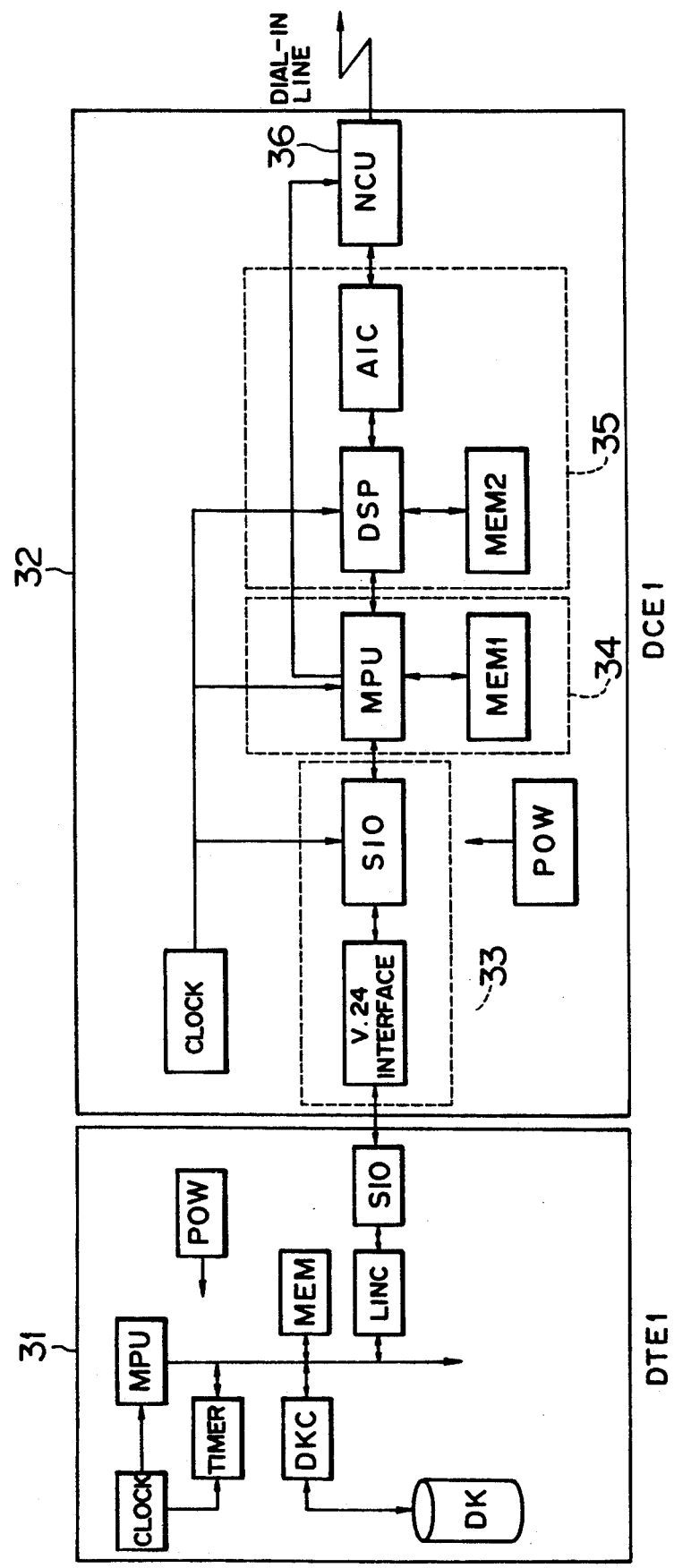
FIG. 4 is a block diagram showing the configuration of hardware of a terminal and a modem for implementing the method of the present invention.

A terminal DTE1 and a modem DCE1 for implementing the method of the present invention has the configuration of hardware shown in a block diagram FIG. 4. In FIG. 4, the modem DCE1 is connected via a serial/parallel interface converter SIO to an SIO of the DTE1, and parallel signals in the DCE1 are transferred to and from a microprocessor MPU. The MPU is connected to a digital signal processor DSP, to an analog/-digital converter AIC via the DSP, and then to dial-in lines via the AIC. The MPU and the DSP includes memories MEM1, MEM2, respectively. The SIO, the MPU and the DSP are supplied with a clock signal from a common clock signal source CLOCK. Designated by POW is a power supply for supplying operating power to the respective components. The DTE1 comprises a MPU, CLOCK, MEM and POW as with the DCE1. In addition to this, a hard disk DK is connected to buses for the MPU via a disk controller DKC, and the buses are connected to the SIO via a line controller LINC.

With the above-mentioned configuration of hardware, the DCE1 stores programs necessary to perform the following various functions in its memories:
(1) a plurality of modem circuits for operation modes,
(2) select means for shifting the plurality of modem circuits for operation modes from one to another,
(3) means for operating the select means by a signal,
(4) telephone line network control unit NCU, and
(5) extension specifying signal detecting circuit.

Figure 5:
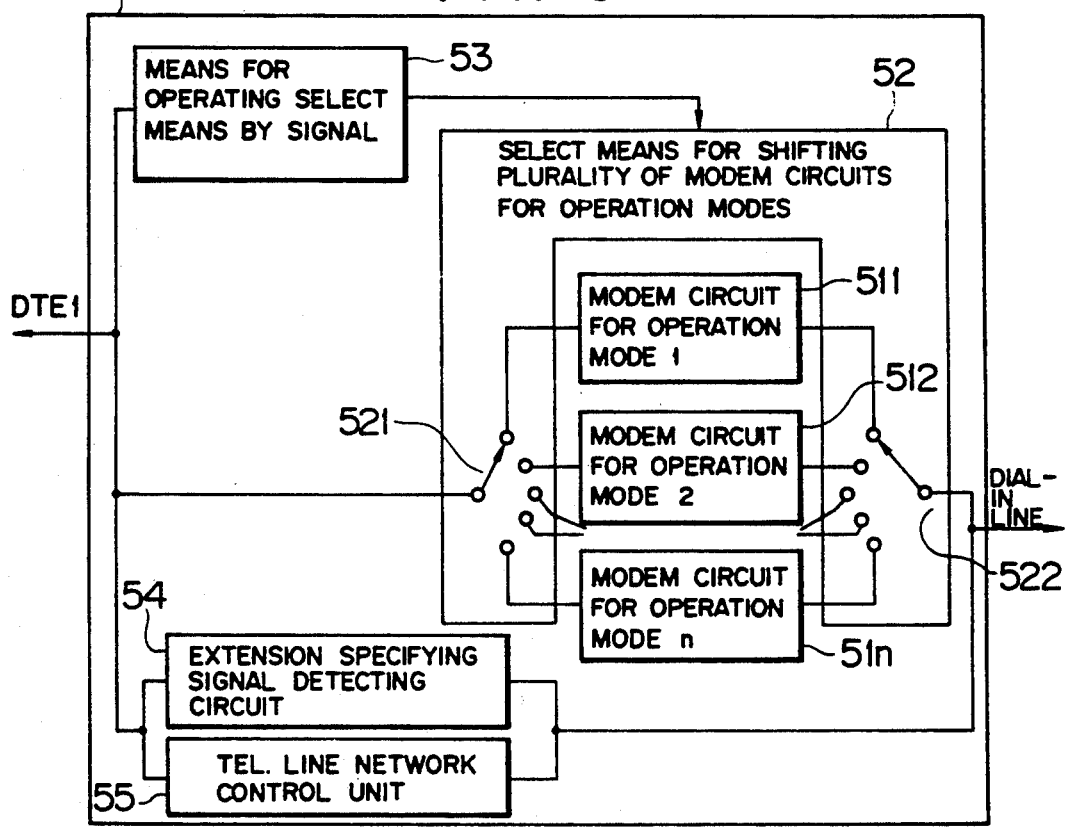
FIG. 5 is a functional block diagram of the modem.

FIG. 5 shows the functions of the DCE1 in more detail. In FIG. 5, designated by 511, 512, . . . 51n are modem circuits having different operation modes from one another, of which input circuits and output circuits are selectively connected to the DTE1 and the dial-in circuit via select means 52 for shifting the plurality of modem circuits for operation modes from one to another, respectively.

The function of the select means 52 is equivalent to that of multi-contact change-over switches 521 and 522 respectively associated with the input circuits and the output circuits thereof. These switches 521 and 522 of the input circuits and the output circuits have their movable contacts which can be shifted to any ones of predetermined stationary contacts in interlock relation for selecting the modem circuit corresponding to the desired mode. In practice, the switching function is implemented using an electronic circuit. Thus, shifting of the switches is executed in such a manner that means 53 for operating the select means by a signal receives a signal from the DTE1 and then supplies a select signal to the select means 52. The DCE1 further includes an extension specifying signal detecting circuit 54 and a telephone line network control unit (NCU) 55.

Figure 6:
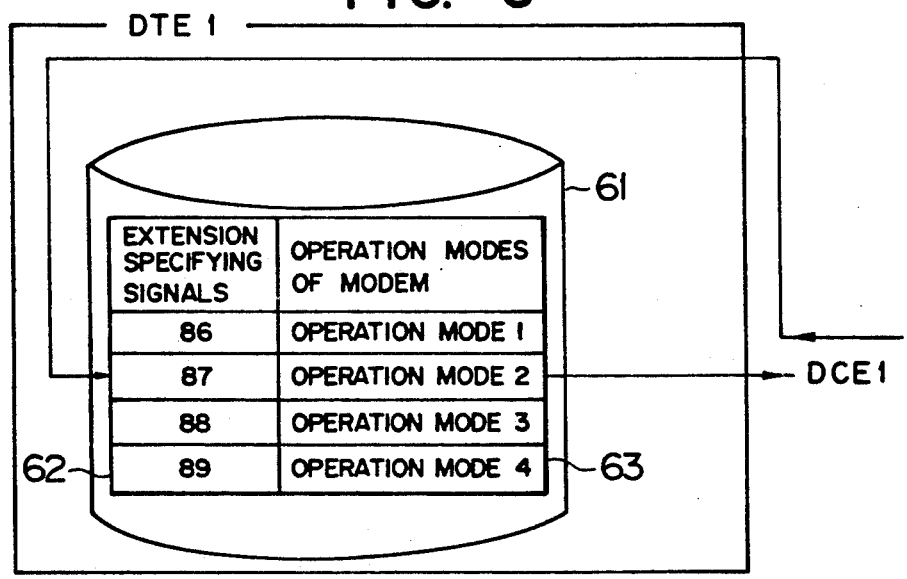
FIG. 6 is a functional block diagram of the terminal.

Next, the DTE1 has the configuration of hardware as mentioned above, and stores in its memory programs necessary to achieve a function of means for converting the extension specifying signal received from the DCE1 to the operation mode of the modem, as well as data and so forth. Such a function is conceptually shown in FIG. 6. Designated by 61 is means for determining the correlation between the extension specifying signals and the operation modes of the modem. For instance, this means can be implemented by storing the extension specifying signal indicated by numeral 62 and the operation mode 63 of the modem in the hard disk so as to keep corresponding relation therebetween, and then applying a signal upon instruction from the DCE1 to read out the corresponding operation mode for returning it to the DCE1.

Figure 7:
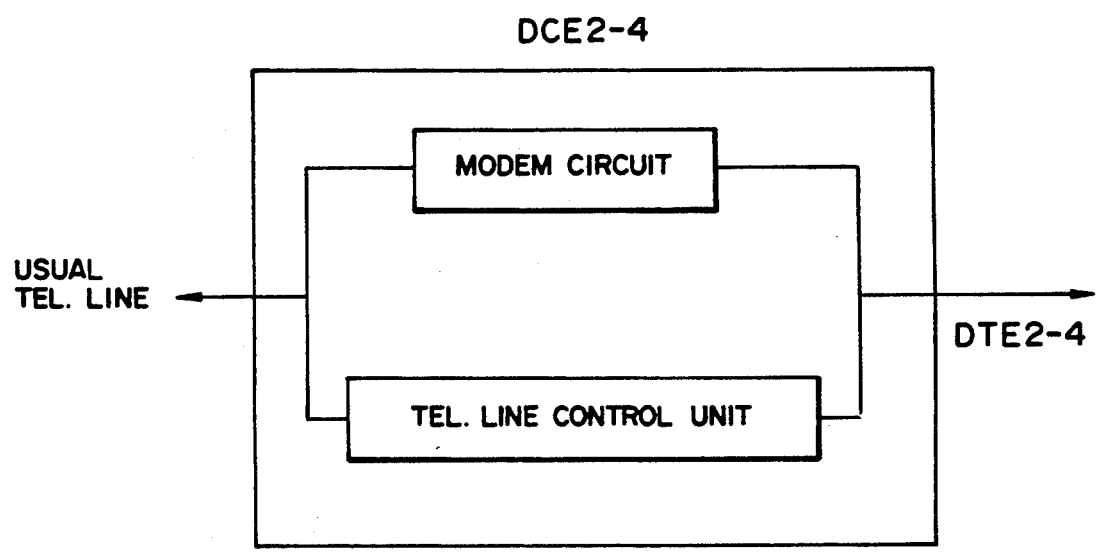
FIG. 7 is a functional block diagram of modems 2-4.
Figure 8:
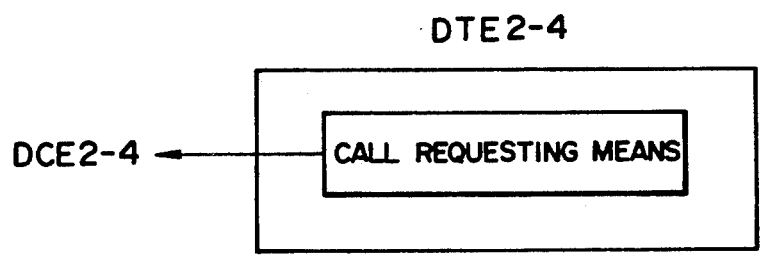
FIG. 8 is a functional block diagram of terminals 2-4.

As shown in FIG. 7, modems DCE 2-4 each have functions of (1) a modem circuit and (2) a telephone line network control unit. As shown in FIG. 8, terminals DTE 2-4 each have a function requesting a call.

With the method according to the present invention, one of the calling side DCE 2-4 dials a telephone number inclusive of the extension specifying signal corresponding to its own modem mode. After arrival of a call, the answering side DCE1 detects the extension specifying signal and informs the answering side DTE1. Then, the answering side DTE1 selects the operation mode corresponding to the extension specifying signal and instructs that operation mode to the answering side DCE1 for making the operation mode of the answering side DCE1 coincident with the operation mode of one of the calling side DCE 2-4.

Figure 9:
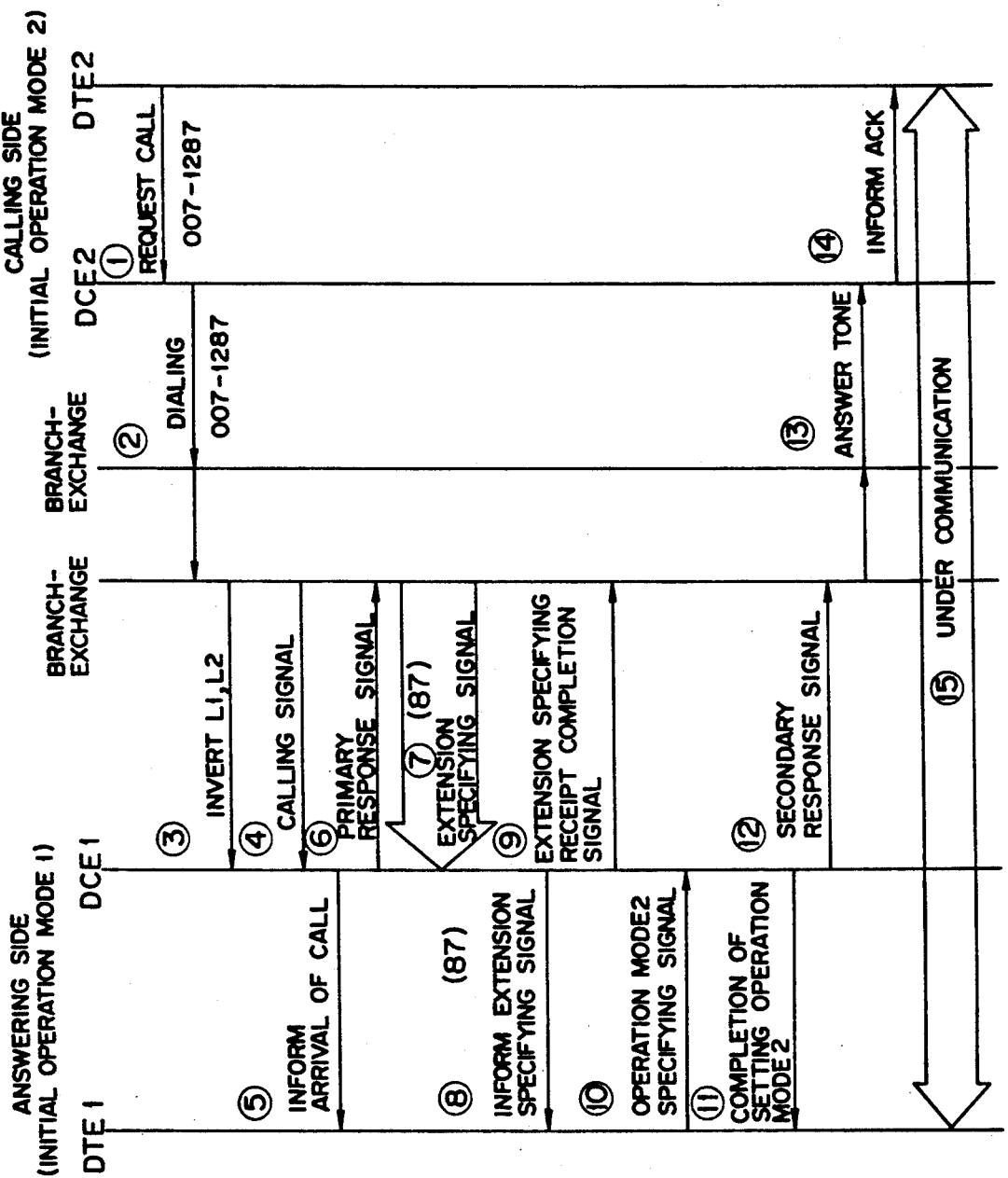
FIG. 9 is a flowchart of signals transferred in the process from calling to acknowledgement between a terminal, a modem and a branch-exchange on the calling side, and a modem, a terminal and a branch-exchange on the answering side according to the method of the present invention.

Operation of the present invention will now be described with reference to FIG. 9. In the illustrated example, the terminal DTE2 on the calling side is connected to the telephone line via the modem DCE2, while the terminal DTE1 on the answering side is connected to the telephone line via the modem DCE1. It is also assumed that the telephone line connected to the DCE1 on the answering side is a dial-in line and the number of digits representing the extension specifying signal is two.

Supposing that prior to start of the operation, the calling side is in an initial operation mode 2 and the answering side is in an initial operation mode 1.

① terminal DTE2 on the calling side requests a call to the modem DCE2.
② Afterward, the modem DCE2 actuates the NCU for originating a call.
③ Afterward, the branch-exchange on the answering side performs inversion of polarity for the modem DCE1, e
④ and start calling.
⑤ On the answering side, when the modem DCE1 detects a calling signal, it informs arrival of the call to the terminal DTE1,
⑥ and performs primary response to the branch-exchange.
⑦ Afterward, the branch-exchange sends out the extension specifying signal to the modem DCE1.
⑧ Upon detecting the extension specifying signal, the modem DCE1 informs that extension specifying signal to the terminal DTE1,
⑨ and thereafter, sends out an extension specifying receipt completion signal to the branch-exchange.
⑩ Upon receipt of the extension specifying signal, the terminal DTE1 employs its own means for converting the extension specifying signal to the operation mode of the modem, to make conversion to the modem operation mode 2 corresponding to the extension specifying signal, thereby instructing the modem DCE1 to set the operation mode 2.
⑪ The modem DCE1 sets the operation mode 2 in its own plural modem circuits for operation modes, informs the completion of setting the operation mode 2 to the terminal DTE1, and then sets the internal lines on the answering side between the terminal DTE1 and the modem DCE1 to the desired operation mode 2.

Thus, the modems at the both ends of the telephone line, i.e., on the calling and answering sides, are automatically matched to the operation mode 2, i.e., the same operation mode, whereby the object of the present invention is achieved.

⑫ Afterward, the modem DCE1 sends out a secondary response signal to the branch-exchange.

⑬ The answering side branch-exchange sends out an answer tone to the calling side modem DCE2 via the calling side branch-exchange.

⑭ The calling side modem informs an acknowledgement to the terminal DTE2,

⑮ and the line between the calling side modem and the answering side modem comes into a communicable state.

As described above, since the operation mode of the answering side modem is matched with the operation mode of the calling side modem by the use of the extension specifying signal dialed in through the telephone line, the method of matching operation modes of modems according to the present invention can present advantageous effect below:

(1) the operation mode on the answering side can automatically be matched with that on the calling side without the need or trouble of intricate manual matching; and (2) the matching method can be used nationwide, because a signal provided in the existing service by NTT (Nippon Telegraph & Telephone Corp.) is employed as the select signal.

What is claimed is:

1. A communication system comprising a modem connected to an analog telephone line using a direct inward dialing line and a digital terminal for sending data to said analog telephone line or for receiving data from said analog telephone line via said modem, wherein said communication system comprises:

said modem having means for detecting an extension instructing signal via said analog telephone line, means for providing said detected extension instructing signal to said digital terminal, means for representing a plurality of operating modes, and a mode switching means for changing an operation mode in response to an operation mode instruction signal of an answering side digital terminal; and said digital terminal having memory means for storing said corresponding relationship between said extension instructing signal and said operation mode of said modem, and an outputting means for outputting said operation mode instruction signal to said modem, whereby an operation mode corresponding to said extension instructing signal provided via said modem is selected, and said modem is set to the selected operation mode.

2. A method of a mode matching between a first data circuit terminating equipment and a second data circuit terminating equipment in a communication system, wherein a first terminal is connected to a communications network, including a plurality of communication circuits, via said first circuit terminating equipment and a second terminal is connected to said communications network via said second data circuit terminating equipment, said communications network having calling means for calling said first data circuit terminating equipment after detecting a request signal from said second data circuit terminating equipment, and instructing signal transmitting means for transmitting an instructing signal to said first data circuit terminating equipment, wherein said method comprises the steps of:

calling from said second terminal by means of a telephone number including information corresponding to an operation mode of said second data circuit terminating equipment via said calling means and said instructing signal transmitting means;

generating said instructing signal in said instructing signal transmitting means to correspond with the operation mode of said second data circuit terminating equipment;

detecting by said first data circuit terminating equipment at least a portion of said instructing signal;

providing said detected portion of the instructing signal to said first terminal; and instructing, by said first terminal, in response to said detected portion of the instructing signal an operation mode of said first data circuit terminating equipment to match said operation mode of said second data circuit terminating equipment.

3. A method of a mode matching according to claim 2 wherein said detected portion of the instructing signal is an extension instructing signal.

4. A method of matching a modem mode between a calling side and an answering side of a telephone communication line in a telephone system, wherein a second digital terminal is connected to an analog telephone communication line via a second modem on said calling side of the telephone communication line and a first digital terminal is connected to a direct inward dialing line via a first modem, said direct inward dialing line is used as an analog telephone line on an answering side of the telephone communication line; wherein said method comprises the steps of:

calling from said second digital terminal by means of a telephone number including an extension instructing signal of a direct inward dialing-service;

generating said extension instructing signal to correspond with an operation mode of said second modem;

detecting said extension instructing signal by said first modem;

providing said detected extension instructing signal to said first digital terminal;

converting, by said first digital terminal, said detected extension instructing signal to an operation mode corresponding to said extension instructing signal by using modem operation mode converting information which is stored in said first digital terminal;

instructing setting of an operation mode of said first modem by said first digital terminal to match said operation mode of said first modem with said operation mode of said second modem based on said converted operation mode.

* * * * *